(12) United States Patent
Hiratsuka (10) Patent No.: US 11,349,121 B2
(45) Date of Patent: May 31, 2022

(54) POSITIVE ELECTRODE ACTIVE SUBSTANCE FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(71) Applicant: Panasonic Intellectual Property Management Co., Ltd., Osaka (JP)

(72) Inventor: Hidekazu Hiratsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 16/789,662

(22) Filed: Feb. 13, 2020

(65) Prior Publication Data

US 2020/0185712 A1 Jun. 11, 2020

Related U.S. Application Data

(63) Continuation of application No. PCT/JP2018/026442, filed on Jul. 13, 2018.

(30) Foreign Application Priority Data

Aug. 31, 2017 (JP) .............................. JP2017-167139

(51) Int. Cl.
*H01M 4/485* (2010.01)
*H01M 10/0525* (2010.01)
*H01M 4/02* (2006.01)

(52) U.S. Cl.
CPC ....... *H01M 4/485* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2015/0221934 A1 | 8/2015 | Hiratsuka et al. | |
| 2015/0243982 A1* | 8/2015 | Hiratsuka | H01M 4/505 429/223 |

(Continued)

FOREIGN PATENT DOCUMENTS

| | | |
|---|---|---|
| CN | 104821393 A | 8/2015 |
| CN | 105612124 A | 5/2016 |

(Continued)

OTHER PUBLICATIONS

International Search Report dated Oct. 16, 2018, issued in counterpart application No. PCT/JP2018/026442, with English translation. (4 pages).

(Continued)

*Primary Examiner* — Wyatt P McConnell
(74) *Attorney, Agent, or Firm* — WHDA, LLP (57) ABSTRACT

This positive electrode active substance for a nonaqueous electrolyte secondary battery contains secondary particles that are aggregates of primary particles of a lithium transition metal oxide. The average particle diameter of the primary particles is within the range of 0.5 to 2 μm, the compressive breaking strength of the primary particles is 1,000 MPa or greater, and the crystallite diameter of the primary particles is within the range of 100 to 280 nm.

6 Claims, 1 Drawing Sheet

(56) References Cited

U.S. PATENT DOCUMENTS

| | | |
|---|---|---|
| 2016/0248090 A1 | 8/2016 | Maeda et al. |
| 2016/0254539 A1 | 9/2016 | Kagei et al. |
| 2017/0092945 A1* | 3/2017 | Hiratsuka ............... H01M 4/38 |
| 2018/0198122 A1 | 7/2018 | Hiratsuka et al. |

FOREIGN PATENT DOCUMENTS

| | | |
|---|---|---|
| JP | 2014-149962 A | 8/2014 |
| JP | 2015-164119 A | 9/2015 |
| JP | 2016-12500 A | 1/2016 |
| JP | 2016-149258 A | 8/2016 |
| JP | 2016-157677 A | 9/2016 |
| WO | 2014/103166 A1 | 7/2014 |

OTHER PUBLICATIONS

English Translation of Search Report dated Jan. 30, 2022, issued in counterpart CN Application No. 201880031715.X. (2 pages).

* cited by examiner

POSITIVE ELECTRODE ACTIVE SUBSTANCE FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

TECHNICAL FIELD

The present disclosure relates to a positive electrode active material for non-aqueous electrolyte secondary batteries, a positive electrode for non-aqueous electrolyte secondary batteries, and a non-aqueous electrolyte secondary battery.

BACKGROUND ART

Recently, non-aqueous electrolyte secondary batteries comprising a positive electrode, a negative electrode and a non-aqueous electrolyte, which achieve charge and discharge by movement of lithium ions between positive and negative electrodes, have been used widely as secondary batteries having a high output and a high energy density.

As the positive electrode active material for use in positive electrodes of non-aqueous electrolyte secondary batteries, for example, the followings are known.

For example, Patent Literature 1 discloses a positive electrode active material for non-aqueous electrolyte secondary batteries represented by the following composition formula: $Li_xNi_{1-(y+z)}Mn_yCo_zO_{2+\alpha}$ ($0.9 \leq x \leq 1.2$, $0 < y+z \leq 0.3$, and $-0.1 \leq \alpha \leq 0.1$), wherein an average particle diameter D50 is 5 to 7 µm, a particle strength is 60 MPa or more, and an average void ratio in the internal part of particles having a particle diameter of 3 µm or more is 5% or less.

For example, Patent Literature 2 discloses a positive electrode active material for non-aqueous electrolyte secondary batteries represented by the following general formula: $LiNi_xCo_yM_{(1-x-y)}O_2$ (M: metal element, $0.3 \leq x < 1.0$, $0 < y \leq 0.5$), and composed of particles assembled from crystallites, wherein a compressive fracture strength per particle is 200 MPa or more and 500 MPa or less, a crystallite diameter of the particles in (110) vector direction is 100 nm or more and 300 nm or less.

CITATION LIST

Patent Literature

PATENT LITERATURE 1: Japanese Unexamined Patent Application Publication No. 2016-149258
PATENT LITERATURE 2: International Publication No. WO 2014/103166

SUMMARY

As described above, although various positive electrode active materials for non-aqueous electrolyte secondary batteries are proposed, there is still room for improvement in achieving higher output of non-aqueous electrolyte secondary batteries and suppressing degradation of charge/discharge cycle characteristics.

An object of the present disclosure is to provide a positive electrode active material for non-aqueous electrolyte secondary batteries capable of achieving higher output of non-aqueous electrolyte secondary batteries and suppressing degradation of charge/discharge cycle characteristics.

A positive electrode active material for non-aqueous electrolyte secondary batteries in an aspect of the present disclosure includes secondary particles formed of agglomerated primary particles of lithium transition metal oxide, wherein an average particle diameter of the primary particles is in a range of 0.5 to 2 µm, a compressive fracture strength of the primary particles is 1000 MPa or more, and a crystallite diameter of the lithium transition metal oxide is in a range of 100 to 280 nm.

A positive electrode for non-aqueous electrolyte secondary batteries in an aspect of the present disclosure includes the positive electrode active material for non-aqueous electrolyte secondary batteries.

A non-aqueous electrolyte secondary battery in an aspect of the present disclosure comprises the positive electrode for non-aqueous electrolyte secondary batteries.

According to an aspect of the present disclosure, it becomes possible to achieve higher output of non-aqueous electrolyte secondary batteries and suppress degradation of charge/discharge cycle characteristics.

DESCRIPTION OF EMBODIMENTS

A positive electrode active material for non-aqueous electrolyte secondary batteries in an aspect of the present disclosure includes secondary particles formed of agglomerated primary particles of lithium transition metal oxide, wherein an average particle diameter of the primary particles is in a range of 0.5 to 2 µm, a compressive fracture strength of the primary particles is 1000 MPa or more, and a crystallite diameter of the lithium transition metal oxide is in a range of 100 to 280 nm. By setting the average particle diameter and the crystallite diameter of the primary particles of lithium transition metal oxide having to the range, the conductivity and diffusivity of lithium ions are improved, so that the higher output of the non-aqueous electrolyte secondary battery can be achieved. Further, by setting the compressive fracture strength of the primary particles to in the range, fracture of the primary particles of lithium transition metal oxide caused by charge/discharge of a battery is suppressed, so that degradation of charge/discharge cycle characteristics of the non-aqueous electrolyte secondary battery can be suppressed.

An example of the non-aqueous electrolyte secondary battery in an aspect of the present disclosure is described as follows.

An example of the non-aqueous electrolyte secondary battery in an embodiment comprises a positive electrode, a negative electrode and a non-aqueous electrolyte. Preferably, a separator is arranged between the positive electrode and the negative electrode. Specifically, the non-aqueous electrolyte secondary battery has a structure in which an electrode assembly with a wound structure in which the positive electrode and the negative electrode wound through the separator and the non-aqueous electrolyte are accommodated in an outer package. The electrode assembly is not limited to an electrode assembly with the wound structure, and other types of electrode assembly such as a laminated electrode assembly having positive electrodes and negative electrodes laminated through separators may be used. The shape of the non-aqueous electrolyte secondary battery is not specifically limited, and examples thereof include a cylindrical shape, a rectangular shape, a coin shape, a button shape and a laminate shape.

[Positive Electrode]

The positive electrode includes, for example, a positive electrode current collector such as metal foil and a positive electrode mixture layer formed on the positive electrode current collector. A foil of metal such as aluminum, which is stable in the electric potential range of the positive electrode, a film with such a metal disposed as an outer layer, and the like may be used for the positive electrode current collector.

The positive electrode mixture layer includes a positive electrode active material. Suitably, the positive electrode mixture layer includes a conductive agent and a binder in addition to the positive electrode active material. The thickness of the positive electrode mixture layer is, for example, 10 μm or more.

The positive electrode may be produced by, for example, preparing a positive electrode mixture slurry including a positive electrode active material, a conductive agent and a binder, applying the positive electrode mixture slurry to a positive electrode current collector, drying the applied slurry to form a positive electrode mixture layer, and applying pressure to the positive electrode mixture layer.

Figure 1:
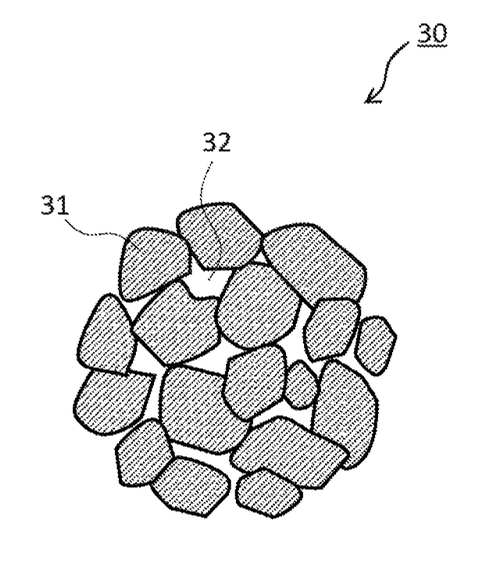
FIG. 1 is an enlarged schematic cross-sectional view showing a particle to compose a positive electrode active material.

FIG. 1 is an enlarged schematic cross-sectional view showing a particle to compose a positive electrode active material. As shown in FIG. 1, the positive electrode active material includes a secondary particle 30 formed of agglomerated primary particles 31 of lithium transition metal oxide. The secondary particle 30 of lithium transition metal oxide has a void 32 formed between the primary particles 31 (hereinafter, referred to as void 32 in secondary particle).

Examples of the lithium transition metal oxide include a lithium transition metal oxide containing a transition metal element such as Co, Mn and Ni. Preferably, the lithium transition metal oxide is, for example, a lithium transition metal oxide containing nickel (Ni) with a Ni content of 30 mol % or more relative to the total mole number of metal elements except for lithium (Li) from the viewpoint of achieving high capacity of a non-aqueous electrolyte secondary battery. Examples of the lithium transition metal oxide containing Ni include an oxide represented by a composition formula: $Li_aNi_xM_{(1-x)}O_2$ (0.95≤a≤1.2, 0.3≤x<1.0, M: metal element other than Li and Ni). In the formula, M may include at least one selected from, for example, cobalt (Co), manganese (Mn), tungsten (W), niobium (Nb), molybdenum (Mo), phosphorus (P) and sulfur (S). Further, M may include at least one selected from magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), lead (Pb), and bismuth (Bi). Among these, Co, Mn and the like are preferred.

The average particle diameter of the primary particles 31 composing the secondary particle 30 of lithium transition metal oxide may be in a range of 0.5 to 2 μm, preferably, for example, in a range of 1 to 2 μm from the viewpoint of further improving the output of the non-aqueous electrolyte secondary battery. The shape of the primary particles 31 is not particularly limited, and is, for example, an ellipsoidal shape or a rod shape. The aspect ratio, i.e., the ratio between the minor diameter and the major diameter of the primary particle 31 (major diameter/minor diameter), is preferably 1.5 or more from the viewpoint of further suppressing degradation of the charge/discharge cycle characteristics of the non-aqueous electrolyte secondary battery. Alternatively, among the primary particles 31 composing the secondary particle 30, for example, 50% or more of the primary particles preferably have an aspect ratio of 1.5 or more. Incidentally, the average particle diameter of the primary particles 31 is calculated based on the major diameter. The minor diameter of the primary particles 31 is, for example, 0.3 μm to 1.3 μm.

The average particle diameter of the primary particles 31 of lithium transition metal oxide may be determined by analyzing the cross-sectional SEM image observed by a scanning electron microscope (SEM). For example, a positive electrode is embedded in a resin and subjected to cross-section polishing (CP) or the like to prepare a cross-section of the positive electrode mixture layer, and the cross-section is photographed by SEM. Alternatively, a powder of lithium transition metal oxide is embedded in a resin and subjected to cross-section polishing (CP) or the like to prepare a cross-section of the lithium transition metal oxide particle, and the cross-section is photographed by SEM. And from the SEM image of the cross-section, 20 primary particles are randomly selected. The grain boundaries of the selected 20 primary particles are observed, and after identification of the outer shape of the primary particles, the major diameter (longest diameter) of each of the 20 primary particles is determined. The average value thereof is assumed to be the average particle diameter of the primary particles.

The average particle diameter of the secondary particles 30 of lithium transition metal oxide is, for example, preferably in a range of 5 μm to 20 μm, more preferably in a range of 7 μm to 18 μm. In the case where the average particle diameter of the secondary particles 30 of lithium transition metal oxide satisfies the range, the packing density of the secondary particles 30 is improved as compared with the case outside the range, so that higher capacity of the non-aqueous electrolyte secondary battery may be achieved. The average particle diameter of the secondary particles 30 of lithium transition metal oxide is a volume average particle diameter measured by laser diffraction, meaning a median diameter at which the volume-integrated value becomes 50% in the particle diameter distribution. The average particle diameter of the secondary particles 30 may be measured, for example, by using a laser diffraction scattering particle size distribution analyzer LA-960 manufactured by Horiba, Ltd.

The secondary particle 30 of lithium transition metal oxide is preferably composed of 50 to 500 primary particles per secondary particle. The secondary particle 30 composed of 50 to 500 primary particles per secondary particle allows, for example, the miniaturization of secondary particle due to charge/discharge cycles of the battery to be suppressed, and degradation of charge/discharge cycle characteristics of the non-aqueous electrolyte secondary battery to be further suppressed in some cases. When evaluating the average particle diameter of the primary particles as a method for evaluating the number of primary particles in a secondary particle, 20 secondary particles having a particle diameter of 5 μm to 20 μm are randomly selected. One lump divided by grain boundaries observed in a selected secondary particle is assumed as a primary particle, and the number thereof is determined. Since the observed surface is a cross-section, two-dimensional evaluation is obtained. The number of the primary particles is obtained by raising the average number observed to the power of 3/2. The integer part of the average value calculated from the selected 20 particles is defined as the number of primary particles.

The compressive fracture strength of the primary particles 31 may be 1000 MPa or more, and is preferably, for example, 5000 MPa or more, from the viewpoint of further suppressing degradation of charge/discharge cycle characteristics of the non-aqueous electrolyte secondary battery. The upper limit of the compressive fracture strength of the primary particle 31 is preferably 50000 MPa or less, because excessive crystal growth causes degradation of output characteristics. The compressive fracture strength of the secondary particle 30 is preferably in a range of 150 to 250 MPa. In the case where the compressive fracture strength of the secondary particle 30 is in the range, for example, the miniaturization of secondary particle 30 due to charge/discharge is suppressed as compared with the case outside the range, and degradation of charge/discharge cycle characteristics of the non-aqueous electrolyte secondary battery is further suppressed in some cases. Here, the compressive fracture strength of the primary particle 31 is the compressive fracture strength per primary particle, and the compressive fracture strength of the secondary particle 30 is the compressive fracture strength per secondary particle. The compressive fracture strength (St) is calculated from a formula: $St=2.8P/\pi d^2$ (P: load applied to particle, d: particle diameter) described in "Journal of the Mining and Metallurgical Institute of Japan", Vol. 81, No. 932, December 1965, pp. 1024-1030. In the formula, d is the particle diameter of the secondary particle or primary particle, and the particle diameter of the secondary particle is used to calculate the compressive fracture strength of the secondary particle 30, while the particle diameter of the primary particle is used to calculate the compressive fracture strength of the primary particle 31. The compressive fracture strength of the secondary particle and the primary particles may be measured, for example, by a micro compression tester MCT-510 manufactured by Shimadzu Corporation. Through observation by a CCD, 20 secondary particles having a particle diameter of 5 to 20 μm are randomly selected. The compressive fracture strength of the selected secondary particles is measured by the micro compression tester, and the average value was taken as the compressive fracture strength of the secondary particle 30. Also, through observation of the secondary particles after fracture, 20 primary particles having a particle diameter of 0.5 μm to 2 μm are selected. The compressive fracture strength of the selected secondary particles is measured by a micro compression tester, and the average value was taken as the compressive fracture strength of the primary particle 31.

The crystallite diameter of the lithium transition metal oxide may be in a range of 100 to 280 nm, and is preferably in a range of 140 to 250 nm from the viewpoint of further improving the output of the non-aqueous electrolyte secondary battery.

The crystallite diameter of the lithium transition metal oxide in the present specification is the crystallite diameter in the (110) vector direction perpendicular to the (003) vector direction in which layers are stacked in a laminar rock salt crystal structure.

The crystallite diameter of the lithium transition metal oxide is calculated by obtaining the powder X-ray diffraction pattern of the lithium transition metal oxide using a powder X-ray diffraction measurement apparatus (manufactured by Bruker AXS, trade name "D8ADVANCE"), and analyzing the powder X-ray diffraction pattern using a whole powder pattern decomposition method (hereinafter referred to as "WPPD method").

The measurement conditions of the powder X-ray diffraction pattern are as follows.
X-ray output: 40 kV×40 mA
Detector: scintillation counter
Goniometer radius: 250 mm
Divergence slit: 0.6°
Scattering slit: 0.6°
Receiving slit: 0.1 mm
Solar slit: 2.5° (incident side, receiving side)

The measurement of the powder X-ray diffraction pattern is performed by a 2θ/θmethod (measurement range: 2θ=15 to 140°, step width: 0.01° using a focusing optical system with a horizontal sample. The scanning time is set to have a main peak ((111) plane) intensity of about 10000 counts.

The analysis procedure using the WPPD method is as follows.

Procedure 1: A software (TOPAS) is activated to read measurement data.

Procedure 2: Emission profile is set up. (Cu tube and Bragg Brentano focusing optical system are selected.)

Procedure 3: Background is set up. (Legendre polynomial is used as profile function, with number of terms set to 8 to 20.)

Procedure 4: Instrument is set up. (Fundamental parameter is used. Slit conditions, filament length and sample length are inputted.)

Procedure 5: Corrections are set up. (Sample displacement is used. Absorption is also used in the case where sample packing density in sample holder is low. In that case, Absorption is fixed to linear absorption coefficient of measurement sample.)

Procedure 6: Crystal structure is set up. (Space group is set as R3-m. Lattice constant, crystallite diameter, and lattice distortion are used. Spread of profile due to crystallite diameter and lattice distortion is set as Lorentz function).

Procedure 7: Calculation is performed. (Background, sample displacement, diffraction intensity, lattice constant, crystallite diameter and lattice distortion are refined, and Le-ball equation is used for calculation.)

Procedure 8: Analysis is completed when standard deviation of crystallite diameter is 6% or less of refined value. When larger than 6%, procedure 9 is performed.

Procedure 9: Spread of profile due to lattice distortion is set as Gaussian function. (Crystallite diameter remains as Lorentz function.)

Procedure 10: Calculation is performed. (Background, sample displacement, diffraction intensity, lattice constant, crystallite diameter, and lattice distortion are refined.)

Procedure 11: Analysis is completed when standard deviation of crystallite diameter is 6% or less of refined value. When larger than 6%, analysis is impossible.

The void ratio of the secondary particle 30 of lithium transition metal oxide is, for example, preferably 10% or less, more preferably in a range of 5 to 10%. And in the case where the void ratio of the secondary particle 30 of lithium transition metal oxide satisfies the range, for example, the electronic conductivity between the primary particles 31 is improved as compared with the case where the range is not satisfied, and the capacity of the non-aqueous electrolyte secondary battery is improved in some cases.

The void ratio of the secondary particle 30 of lithium transition metal oxide is a two-dimensional value determined from the ratio of the area of voids 32 in the secondary particle to the cross-sectional area of the secondary particle 30 of lithium transition metal oxide, which is measured as follows. For example, using analysis software such as Image-Pro PLUS, an outer line is drawn along the surface of each secondary particle 30 in the cross-sectional SEM image photographed so as to determine the total area of the portion surrounded by the outline, the total area being assumed as the cross-sectional area of the secondary particle 30. Also, the total area of black parts of the portion surrounded by the outer line is determined, which is assumed as the area of the voids 32 in the secondary particle. The ratio of the area of the voids 32 in the secondary particle to the cross-sectional area of the secondary particle 30 is calculated, the value being assumed as the void ratio of the secondary particle 30 of lithium transition metal oxide.

The BET specific surface area of the secondary particle 30 of lithium transition metal oxide is preferably, for example, 0.4 m$^2$/g or less. In the case where the BET specific surface area of the secondary particle 30 of lithium transition metal oxide satisfies the range, the primary particle diameter is large, and the powder particle density is high as compared with the case where the range is not satisfied, so that higher capacity of the non-aqueous electrolyte secondary battery can be achieved. The lower limit of the BET specific surface area of the secondary particle 30 of lithium transition metal oxide is, for example, 0.1 m$^2$/g or more, though not particularly limited. The BET specific surface area (A) of the secondary particle 30 of lithium transition metal oxide is measured according to the BET method (nitrogen adsorption method) described in JIS R1626.

The lithium transition metal oxide can be obtained, for example, by mixing a transition metal precursor and a lithium compound, and firing the mixture. The transition metal precursor is a hydroxide of transition metal obtained, for example, by dropping a solution of alkali such as sodium hydroxide to a solution including one or more transition metal salts while stirring this solution, such that the pH is adjusted to the alkali side (for example, 8.5 to 11.5) to cause precipitation (co-precipitation). The particle diameter and the compressive fracture strength of the primary particle of lithium transition metal oxide, the crystallite diameter of lithium transition metal oxide, etc., may be controlled by mainly adjusting the stirring speed of the solution including the transition metal salt, the firing temperature and firing time of a mixture of the transition metal precursor and the lithium compound, etc.

The stirring speed of the solution including a transition metal salt in the present embodiment is, for example, preferably in a range of 100 to 600 rpm, more preferably in a range of 200 to 500 rpm. The transition metal precursor obtained by such a stirring speed has a high tap density, for example, 2.0 g/cm$^3$ or more. By using the transition metal precursor having a high tap density, the particle diameter and compressive fracture strength of the primary particles of lithium transition metal oxide, and the crystallite diameter of lithium transition metal oxide, etc. are easily controlled within the specified range.

The firing temperature of the mixture of the transition metal precursor having a high tap density and the lithium compound is, for example, preferably in a range of 750° C. to 1000° C., more preferably in a range of 850° C. to 950° C. The firing time of the mixture of the transition metal precursor having a high tap density and the lithium compound is, for example, preferably in a range of 5 to 20 hours. By the firing temperature and the firing time, the particle diameter and compressive fracture strength of the primary particles of lithium transition metal oxide, and the crystallite diameter of lithium transition metal oxide, etc., are easily controlled within the specified range.

The content of the lithium transition metal oxide is, for example, preferably 90 mass % or more relative to the total amount of the positive electrode active material, and may be substantially 100 mass %. Incidentally, in a range not impairing the effect of the present invention, the positive electrode active material may include a lithium transition metal oxide not satisfying the ranges of the average particle diameter, compressive fracture strength, crystallite diameter, etc. of the primary particles.

Examples of the conductive agent include carbon materials such as carbon black, acetylene black, Ketjenblack, and graphite. These may be used singly or in combinations of two or more thereof.

Examples of the binder include fluoro resins such as polytetrafluoroethylene (PTFE) and poly (vinylidene fluoride) (PVdF), polyacrylonitrile (PAN), polyimides, acrylic resins, polyolefins, and others. These resins may be combined with carboxymethyl cellulose (CMC) or a salt thereof, poly(ethylene oxide) (PEO), or the like. These may be used singly or in combinations of two or more thereof.

[Negative Electrode]

The negative electrode includes, for example, a negative electrode current collector formed of a metal foil and the like, and a negative electrode mixture layer formed on the negative electrode current collector. As the negative electrode current collector, a foil of metal such as copper which is stable in the potential range of the negative electrode, a film with such a metal disposed on an outer layer, and the like may be used. The negative electrode mixture layer includes a negative electrode active material and a binder. The negative electrode may be produced by, for example, preparing a negative electrode mixture slurry including the negative electrode active material, the binder, etc., applying the negative electrode mixture slurry to the negative electrode current collector, drying the slurry to form a negative electrode mixture layer, and applying pressure to the negative electrode mixture layer.

The negative electrode active material is not particularly limited as long as it can reversibly intercalate and deintercalate lithium ions. For example, carbon materials such as natural graphite and artificial graphite, a metal that can be alloyed with lithium such as silicon (Si) and tin (Sn), or an alloy or a composite oxide including metal elements such as Si and Sn may be used. The negative electrode active materials may be used singly or in combinations of two or more thereof.

As the binder, similarly to the case of the positive electrode, a fluorocarbon resin, PAN, a polyimide, an acrylic resin, a polyolefin or the like may be used. When the mixture slurry is prepared using an aqueous solvent, CMC or its salts, styrene-butadiene rubber (SBR), poly(acrylic acid) (PAA) or its salts, poly(vinyl alcohol) (PVA) and the like are preferably used.

[Separator]

For example, an ion-permeable and insulating porous sheet is used as the separator. Specific examples of the porous sheet include a microporous thin film, woven fabric, and nonwoven fabric. The separator comprises, for example, a polyolefin such as polyethylene and polypropylene, and cellulose. The separator may be a laminate having a cellulose fiber layer and a layer of fibers of thermoplastic resin such as a polyolefin. Also, the separator may be a multi-layered separator including a polyethylene layer and a polypropylene layer, and may have a surface layer comprising an aramid resin or a surface layer containing inorganic filler.

[Non-Aqueous Electrolyte]

The non-aqueous electrolyte includes a non-aqueous solvent and a solute (electrolyte salt) dissolved in the non-aqueous solvent. As the non-aqueous solvent, esters, ethers, nitriles, amides such as dimethylformamide, isocyanates such as hexamethylene diisocyanate and mixed solvents of two or more of these solvents may be used. The non-aqueous solvent may contain a halogen-substituted product formed by replacing at least a part of hydrogen atoms of the solvent with a halogen atom such as fluorine.

Examples of the esters include cyclic carbonate esters such as ethylene carbonate (EC), propylene carbonate (PC) and butylene carbonate; chain carbonate esters such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the nitriles include acetonitrile, propionitrile, butyronitrile, valeronitrile, n-heptane nitrile, succinonitrile, glutaronitrile, adiponitrile, pimelonitrile, 1,2,3-propane tricarbonitrile, and 1,3,5-pentane tricarbonitrile.

Examples of the halogen-substituted product include a fluorinated cyclic carbonate ester such as fluoroethylene carbonate (FEC), a fluorinated chain carbonate ester, and a fluorinated chain carboxylate ester such as methyl fluoropropionate (FMP).

Examples of the electrolyte salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})x$ (where $1<x<6$, and n is 1 or 2), $LiB_{10}Cl_{10}$, LiCl, LiBr, LiI, chloroborane lithium, lithium short-chain aliphatic carboxylates; borate salts such as $Li_2B_4O_7$ and $Li(B(C_2O_4)_2)$; and imide salts such as $LiN(SO_2CF_3)_2$ and $LiN(C_lF_{2l+1}SO_2)(C_mF_{2m+1}SO_2)$ {where l and m are integers of 0 or more}. The electrolyte salts may be used singly or in combinations of two or more thereof. The concentration of the electrolyte salt is, for example, 0.8 to 1.8 mol per L of non-aqueous solvent.

EXAMPLES

Hereinafter, the present disclosure will be further described by way of Examples, but is not limited to the following Examples.

Example 1

[Production of Lithium Transition Metal Oxide]

A mixed aqueous solution was prepared by mixing 1 M nickel nitrate aqueous solution, 1 M cobalt nitrate aqueous solution, and 1 M manganese nitrate aqueous solution in a molar ratio of Ni:Co:Mn=60:20:20. While stirring the mixed aqueous solution at a stirring speed of 500 rpm, 1 M sodium hydroxide aqueous solution was added dropwise thereto until the pH became 8.5, so that a transition metal precursor represented by a composition formula $Ni_{0.6}Co_{0.2}Mn_{0.2}(OH)_2$ was coprecipitated. The tap density of the transition metal precursor was 2.0 g/cm$^3$. The transition metal precursor and LiOH were mixed, and the mixture was fired under an oxygen stream at 900° C. for 10 hours, so that a lithium transition metal oxide represented by a composition formula $Li_{1.01}Ni_{0.6}Co_{0.2}Mn_{0.2}O_2$ was synthesized.

The lithium transition metal oxide obtained had a crystallite diameter of 183 nm, an average particle diameter of the primary particles of 1.2 µm, and a compressive fracture strength of the primary particles of 8917 MPa. Further, the average particle diameter of the secondary particles was 10 µm, the compressive fracture strength of the secondary particles was 200 MPa, the void ratio of the secondary particles was 7%, the BET specific surface area was 0.32 m$^2$/g, and the average number of primary particles per secondary particle was 164. Incidentally, the average particle diameter of the secondary particles is the volume average particle diameter, and the same applies to the following Examples and Comparative Examples.

[Production of Positive Electrode]

The lithium transition metal oxide was used as a positive electrode active material. Mixing of 95.8 mass % of the positive electrode active material, 3 mass % of carbon powder, and 1.2 mass % of polyvinylidene fluoride powder was performed, and an appropriate amount of N-methyl-2-pyrrolidone (NMP) was further added to the mixture, so that a positive electrode mixture slurry was prepared. The slurry was applied to both sides of a current collector made of aluminum foil by doctor blade method, and after drying the coated film, the coated film was rolled at a pressure of 500 MPa by a roller, so that a positive electrode having a positive electrode mixture layer formed on both sides of a positive electrode current collector was produced. A portion where no mixture layer was formed was provided at the center in the longitudinal direction of the current collector, to which a positive electrode tab was attached. The thickness of the positive electrode mixture layer was about 140 µm, and the total thickness of both sides of the current collector was about 300 µm.

[Production of Negative Electrode]

Mixing of 98.2 mass % of graphite, 0.7 mass % of styrene-butadiene rubber, and 1.1 mass % of carboxymethyl cellulose was performed, with which water was mixed to prepare a slurry. The slurry was applied to both sides of a current collector made of copper foil by doctor blade method, and after drying the coated film, the coated film was rolled by a roller, so that a negative electrode having a negative electrode mixture layer formed on both sides of a negative electrode current collector was produced. A portion where no mixture layer was formed was provided on both ends in the longitudinal direction of the current collector, to which a negative electrode tab was attached. The thickness of the negative electrode mixture layer was about 120 µm, and the total thickness of both sides of the current collector was about 250 µm.

[Production of Non-aqueous Electrolytic Solution]

In a mixed non-aqueous solvent of equal volumes of ethylene carbonate (EC) and diethyl carbonate (DEC), $LiPF_6$ was dissolved at a concentration of 1.6 mol/L to obtain a non-aqueous electrolytic solution.

[Production of Non-Aqueous Electrolyte Secondary Battery]

Using the positive electrode, the negative electrode, the non-aqueous electrolytic solution, and a separator, a non-aqueous electrolyte secondary battery was produced by the following procedure.

(1) A positive electrode and a negative electrode were wound through a separator to produce an electrode assembly with a wound structure.

(2) Insulating plates were disposed at the top and bottom of the electrode assembly, and the wound electrode assembly was accommodated in a cylindrical battery outer can having a diameter of 18 mm and a height of 65 mm.

(3) The current collecting tab of the negative electrode was welded to the inner surface of the bottom of the battery outer can, and the current collecting tab of the positive electrode was welded to the bottom plate of the sealing body.

(4) A non-aqueous electrolytic solution was injected from the opening of the battery outer can, and then the battery outer can was sealed by the sealing body.

Example 2

A lithium transition metal oxide was produced in the same manner as in Example 1, except that the stirring speed of the mixed aqueous solution was changed to 200 rpm in the synthesis of the lithium transition metal oxide. The lithium transition metal oxide obtained had a crystallite diameter of 170 nm, an average particle diameter of the primary particles of 0.5 μm, and a compressive fracture strength of the primary particles of 1070 MPa. Further, the volume average particle diameter of the secondary particles was 10 μm, the compressive fracture strength of the secondary particles was 130 MPa, the void ratio of the secondary particles was 10%, the BET specific surface area was 0.40 m$^2$/g, and the average number of primary particles per secondary particle was 524.

A non-aqueous electrolyte secondary battery was produced in the same manner as in Example 1, using the lithium transition metal oxide described above as the positive electrode active material of Example 2.

Example 3

A lithium transition metal oxide was produced in the same manner as in Example 1, except that the stirring speed of the mixed aqueous solution was changed to 600 rpm in the synthesis of the lithium transition metal oxide. The lithium transition metal oxide obtained had a crystallite diameter of 190 nm, an average particle diameter of the primary particles of 2.0 μm, and a compressive fracture strength of the primary particles of 11146 MPa. Further, the volume average particle diameter of the secondary particles was 10 μm, the compressive fracture strength of the secondary particles was 195 MPa, the void ratio of the secondary particles was 5%, the BET specific surface area was 0.25 m$^2$/g, and the average number of primary particles per secondary particle was 164.

A non-aqueous electrolyte secondary battery was produced in the same manner as in Example 1, using the lithium transition metal oxide described above as the positive electrode active material of Example 3.

Example 4

A lithium transition metal oxide was produced in the same manner as in Example 1, except that the firing temperature was changed to 850° C. in the synthesis of the lithium transition metal oxide. The lithium transition metal oxide obtained had a crystallite diameter of 102 nm, an average particle diameter of the primary particles of 1.0 μm, and a compressive fracture strength of the primary particles of 3963 MPa. Further, the volume average particle diameter of the secondary particles was 10 μm, the compressive fracture strength of the secondary particles was 130 MPa, the void ratio of the secondary particles was 8%, the BET specific surface area was 0.33 m$^2$/g, and the average number of primary particles per secondary particle was 353.

A non-aqueous electrolyte secondary battery was produced in the same manner as in Example 1, using the lithium transition metal oxide described above as the positive electrode active material of Example 4.

Example 5

A lithium transition metal oxide was produced in the same manner as in Example 1, except that the firing temperature was changed to 930° C. in the synthesis of the lithium transition metal oxide. The lithium transition metal oxide obtained had a crystallite diameter of 279 nm, an average particle diameter of the primary particles of 1.5 μm, and a compressive fracture strength of the primary particles of 11899 MPa. Further, the volume average particle diameter of the secondary particles was 10 μm, the compressive fracture strength of the secondary particles was 200 MPa, the void ratio of the secondary particles was 6%, the BET specific surface area was 0.28 m$^2$/g, and the average number of primary particles per secondary particle was 252.

A non-aqueous electrolyte secondary battery was produced in the same manner as in Example 1, using the lithium transition metal oxide described above as the positive electrode active material of Example 5.

Comparative Example 1

A lithium transition metal oxide was produced in the same manner as in Example 1, except that the stirring speed of the mixed aqueous solution was changed to 100 rpm in the synthesis of the lithium transition metal oxide. The lithium transition metal oxide obtained had a crystallite diameter of 120 nm, an average particle diameter of the primary particles of 0.2 μm, and a compressive fracture strength of the primary particles of 987 MPa. Further, the volume average particle diameter of the secondary particles was 10 μm, the compressive fracture strength of the secondary particles was 100 MPa, the void ratio of the secondary particles was 15%, the BET specific surface area was 0.50 m$^2$/g, and the average number of primary particles per secondary particle was 1000.

A non-aqueous electrolyte secondary battery was produced in the same manner as in Example 1, using the lithium transition metal oxide described above as the positive electrode active material of Comparative Example 1.

Comparative Example 2

A lithium transition metal oxide was produced in the same manner as in Example 1, except that the stirring speed of the mixed aqueous solution was changed to 600 rpm and the firing temperature was changed to 930° C. in the synthesis of the lithium transition metal oxide. The lithium transition metal oxide obtained had a crystallite diameter of 290 nm, an average particle diameter of the primary particles of 2.5 μm, and a compressive fracture strength of the primary particles of 22937 MPa. Further, the volume average particle diameter of the secondary particles was 10 μm, the compressive fracture strength of the secondary particles was 220 MPa, the void ratio of the secondary particles was 3%, the BET specific surface area was 0.10 m$^2$/g, and the average number of primary particles per secondary particle was 11.

A non-aqueous electrolyte secondary battery was produced in the same manner as in Example 1, using the lithium transition metal oxide described above as the positive electrode active material of Comparative Example 2.

[Output Test]

For the non-aqueous electrolyte secondary batteries of each Example and each Comparative Example, a constant current charging was performed to 4.1 V with a current value of 2000 mA at 1 It-rate under condition of 25° C., and after a constant voltage charging at 4.1 V, a constant current discharging at 2000 mA was performed to 2.5 V. The discharge capacity at this time was taken as the rated capacity of the non-aqueous electrolyte secondary battery of each Example and each Comparative Example.

Subsequently, after charging the non-aqueous electrolyte secondary batteries of each Example and each Comparative Example to 50% of the rated capacity, the battery temperature was set to 25° C., and the discharge end voltage was set to 2 V. The output value at a state of charge (SOC) of 50% was determined from the maximum current value chargeable for 10 seconds using the following equation.

Output value (SOC 50%)=(Maximum current value)×(Discharge termination voltage (2.0 V))

[Charge/Discharge Cycle Test]

For the non-aqueous electrolyte secondary battery of each Example and each Comparative Example, a constant current charging was performed to 4.1 V with a current value of 2000 mA at 1 It-rate under condition of 25° C., and after a constant voltage charging at 4.1 V, a constant current discharging at 2000 mA was performed to 2.5 V. The charge/discharge cycle was performed 500 times to determine the capacity retention rate using the following equation.

Capacity retention rate (%)=Discharge capacity at 500th cycle/Discharge capacity at first cycle×100

Table 1 summarizes the crystallite diameter, the average particle diameter and compressive fracture strength of the primary particles, the average particle diameter and void ratio of the secondary particles, and the BET specific surface area of the lithium transition metal oxide for use in each Example and each Comparative Example; and the rated capacity (discharge capacity), output value, and capacity retention rate of the non-aqueous electrolyte secondary battery of each Example and each Comparative example.

The lithium transition metal oxide used in each Example and each Comparative Example is secondary particles formed of agglomerated primary particles of lithium transition metal oxide. Examples 1 to 5, where the average particle diameter of the primary particles was in the range of 0.5 to 2.0 μm, the compressive fracture strength of the primary particles was 1000 MPa or more, and the crystallite diameter of the lithium transition metal oxide was in the range of 100 to 280 nm, exhibited a high output in comparison with Comparative Examples 1 to 2, where one of the average particle diameter, compressive strength and crystallite diameter of the primary particles was not satisfied, and Examples 1 to 5 exhibited an equivalent or higher capacity retention rate in the charge/discharge cycle in comparison with Comparative Examples 1 to 2.

REFERENCE SIGNS LIST

30: SECONDARY PARTICLE
31: PRIMARY PARTICLE
32: VOID

The invention claimed is:

1. A positive electrode active material for non-aqueous electrolyte secondary batteries including secondary particles formed of agglomerated primary particles of lithium transition metal oxide, wherein
an average particle diameter of the primary particles is in a range of 0.5 to 2 μm,
a compressive fracture strength of the primary particles is 1000 MPa or more, and
a crystallite diameter of the lithium transition metal oxide is in a range of 100 to 280 nm.

2. The positive electrode active material for non-aqueous electrolyte secondary batteries according to claim 1, wherein an average particle diameter of the secondary particles is in a range of 5 to 20 μm.

3. The positive electrode active material for non-aqueous electrolyte secondary batteries according to claim 1, wherein a void ratio of the secondary particles is 10% or less.

4. The positive electrode active material for non-aqueous electrolyte secondary batteries according to claim 1, wherein a BET specific surface area of the secondary particles is 0.4 m$^2$/g or less.

5. A positive electrode for non-aqueous electrolyte secondary batteries including the positive electrode active material for non-aqueous electrolyte secondary batteries according to claim 1.

TABLE 1

| | Lithium transition metal oxide | | | | | | Battery characteristics | | |
|---|---|---|---|---|---|---|---|---|---|
| | Crystallite diameter nm | Average Particle Diameter of primary particles μm | Compressive fracture strength of primary particles MPa | Average Particle diameter of secondary particles μm | Void ratio of secondary particles % | BET specific surface area m$^2$/g | Rated capacity mAh | Output W | Capacity retention rate % |
| Example 1 | 183 | 1.2 | 8917 | 10 | 7 | 0.32 | 2012 | 20 | 90 |
| Example 2 | 170 | 0.5 | 1070 | 10 | 10 | 0.40 | 2000 | 20 | 86 |
| Example 3 | 190 | 2.0 | 11146 | 10 | 5 | 0.25 | 2040 | 19 | 90 |
| Example 4 | 102 | 1.0 | 3963 | 10 | 8 | 0.33 | 2020 | 21 | 88 |
| Example 5 | 279 | 1.5 | 11899 | 10 | 6 | 0.28 | 2040 | 18 | 91 |
| Comparative Example 1 | 120 | 0.2 | 987 | 10 | 15 | 0.50 | 1960 | 19 | 60 |
| Comparative Example 2 | 290 | 2.5 | 22937 | 10 | 3 | 0.10 | 2050 | 10 | 92 |

6. A non-aqueous electrolyte secondary battery comprising the positive electrode for non-aqueous electrolyte secondary batteries according to claim 5.

* * * * *